(12) United States Patent
Shen et al.

(10) Patent No.: US 7,849,178 B2
(45) Date of Patent: Dec. 7, 2010

(54) GRID COMPUTING IMPLEMENTATION

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 12/101,225

(22) Filed: Apr. 11, 2008

(65) Prior Publication Data

US 2009/0259741 A1 Oct. 15, 2009

(51) Int. Cl.
*G06F 15/173* (2006.01)
(52) U.S. Cl. .................. 709/223; 709/224; 709/225; 705/27
(58) Field of Classification Search .............. 709/223, 709/224, 225; 705/27
See application file for complete search history.

(56) References Cited

U.S. PATENT DOCUMENTS

2008/0177861 A1* 7/2008 Basani et al. ............... 709/218

* cited by examiner

*Primary Examiner*—John Follansbee
*Assistant Examiner*—Glenford Madamba
(74) *Attorney, Agent, or Firm*—Toler Law Group (57) ABSTRACT

A method, apparatus, and program product that facilitates the implementation of grid or distributed network computing by automatically organizing a group of computers into a hierarchical, or tree networked system. The computer servers are selected into subgroups with each subgroup selecting a server to act as its leader. The leader is responsible for reporting performance characteristics of the servers in the subgroup to a master catalog server housed in a centralized management facility. The hierarchical system contemplated by embodiments of the invention reduces the number of messages that must be sent between the servers in the system necessary to monitor and manage the system. This reduction in the number of messages that must be sent between the servers in the system reduces the amount of server resources dedicated to overhead monitoring and managing, freeing these resources to be dedicated to performing the common processing task that grid or distributed network system was established to perform.

20 Claims, 8 Drawing Sheets

GRID COMPUTING IMPLEMENTATION

FIELD OF THE INVENTION

The present invention relates generally grid computing systems that distribute large processing tasks among a group of computers or servers with the purpose of maximizing system resources and decreasing the amount of time necessary to perform the processing task.

BACKGROUND OF THE INVENTION

Grid computing typically networks server computers together into a working group to accomplish a common computer processing task. The processing task is divided into smaller subtasks, with each subtask being assigned to an individual server computer in the group. The subtasks are generally performed simultaneously with the other subtasks being performed by the other server computers in the group. The servers accomplish work on the processing task simultaneously, decreasing the amount of time necessary for its completion.

Most grid computing architectures include a centralized server computer, or host facility, that transmits an information request, e.g., a ping, to each server computer in the working group. Each server computer also sends ping messages to its neighbors in the grid. The ping messages assess the health and availability of server computers in the working group, as well as the health of the working group system as a whole. Health generally regards the proper functioning of the computer server and its ability to perform its expected role. Availability relates to health and regards the computer server's responsiveness and its current state. For instance, availability may pertain to whether the computer server's resources are currently dedicated to another processing task, inhibiting its ability to assume a new processing task.

In the typical grid, or distributed network (hereinafter referred to simply as grid, or, the grid), each server in the working group communicates with its neighbor, and that neighbor forwards the health and availability information on through successive computer servers, which similarly forward their own health and availability information. This succession leads to thousands of pings sent between computer servers of the working group.

A ping message, or request, is sent to each server in the working group for each other server in the working group. Thus, for a working group of 10 servers implementing grid computing, a total of 9 ping messages would have to be sent to each server computer (a total of 90 for the entire system) to set up, monitor, and maintain the grid. If a working group contains 1,000 servers, there will be a total of 999,000 (1000× (1000−1)) ping messages sent to set up, monitor, and maintain the grid. The generation, sending, and processing of these ping messages represent a significant amount of overhead in the system that consumes much of the processing capacity otherwise available to perform the common processing task.

A hop represents each time the health or availability information for a given computer server must pass through or be passed along by another server computer before reaching the centralized management server, or facility. The more hops in a given system, i.e., the more server computers a ping message must pass through, the more overhead is used in monitoring and management. This overhead translates into less efficiency as the system's finite resources are wasted on monitoring and management. Put simply, the more hops the ping message is passed through, the longer failure detection will take and the less responsive the server will be.

Consequently, there exists a need for an improved grid architecture and associated methodology for more efficiently assessing resource health and availability.

SUMMARY OF THE INVENTION

Embodiments of the present invention provide an improved computer implemented method, apparatus and program product for managing a plurality of networked server computers automatically configured into a hierarchical architecture of subgroups configured to cooperate to perform a common processing task. The hierarchical structure includes a lead server computer of each subgroup for monitoring and managing operations of the other server computers of the subgroup, a catalog server computer of the plurality of networked server computers in communication with and configured to manage each lead server computer, and program code executable by one of the plurality of networked server computers for automatically configuring the networked server computers into the hierarchical architecture.

Aspects of the invention may automatically select the lead server computer of each subgroup. Where so configured, embodiments may include a plurality of catalog server computers configured to manage each lead server computer. At least one of the plurality of catalog server computers may be configured to assume an operation from another catalog server computer. The plurality of catalog server computers may be collocated.

According to an embodiment of the invention, the lead server computer may be automatically selected by the other server computers of the subgroup. A new lead server may be automatically selected in response to detected operation affecting lead server computer performance. This selection may be accomplished by the other server computers of the subgroup.

While a typical subgroup may include around 20 server computers, the number of server computers in each subgroup may generally range from around 5 to around 200. The server computers in each subgroup may report status information to their respective lead server computer, which reports subgroup status information to the catalog server computer. Where a new server computer is added to the system, embodiments may automatically assign a new server computer to a subgroup.

These and other advantages and features that characterize embodiments of the invention are set forth in the claims annexed hereto and forming a further part hereof. However, for a better understanding of the embodiments, and of the advantages and objectives attained through its use, reference should be made to the Drawings and to the accompanying descriptive matter in which there are described exemplary embodiments of the invention.

DETAILED DESCRIPTION

Embodiments of the present invention are specialized mechanisms of implementing grid computing. Embodiments consistent with the present invention allow a group of server computers, a working group, to work together as a grid to manage the availability and health of its component servers in a more efficient, effective, and responsive way than is currently available in conventional systems.

Embodiments of the present invention allow a large number of servers to work together in a manner that reduces the overhead associated with monitoring and management of the system, thus freeing system resources for common processing tasks. This efficiency gain enables scalability and raw processing power impossible in known systems.

Embodiments consistent with the current invention increase the efficiency of the grid computers by configuring a network topology differently than conventional systems. In embodiments of the present invention, ping messages are not sent between all server computers and a centralized server, or between neighboring server computers. Embodiments contemplate the working group being dividing into subgroups, with each subgroup typically having no more than 20 server computers each. Each subgroup elects a leader to monitor the health and availability of the server computers in that subgroup. The leader in each subgroup is automatically elected by the server computers in the respective subgroup.

A group of computer servers or catalog servers monitor and manage the leaders in each subgroup. At any given time, the leaders are monitored and managed by one of the available catalog servers (master catalog server) with the other catalog servers operating as backups or stand-bys to assume the function of the current master catalog server if it fails. The catalog servers are hosted at a centralized monitoring and control facility.

The hierarchical network topography created by embodiments of the current invention is different from that created by the typical grid. The embodiments require little or no human intervention to set up. There is little, if any human intervention required to establish the grid. Thousands of servers can be assigned into a working group automatically.

Embodiments of the current invention contemplate that the master catalog server (with associated backups) being at the top of the hierarchy monitoring and managing the leaders at the second-tier of the hierarchy. Leaders manage and monitor the health and availability of both themselves and the other server computers in their respective subgroups, which are in the third and bottom-tier of the hierarchy. The leaders report the health and availability of the server computers in their respective subgroups (including the leaders themselves) to the master catalog server. The network structure contemplated by the embodiments thus resembles that of a pyramid with the catalog servers at the top, the leaders in the second tier, and the server computers in the third and bottom tier.

The hierarchical structure contemplated by the embodiments of the current invention reduces the number of pings that have to be generated between the servers in the working group. For a working group of 1,000 server computers, there would only be two hops for any given ping message: one from an individual server computer to its leader and then another from the leader to the master catalog server. This reduces the total number of ping messages passing through the system, and therefore reduces the amount of system overhead dedicated to monitoring, management, and processing of the ping messages. More system resources are available to perform the common processing tasks the grid was intended to accomplish. This hierarchy, therefore, allows for more efficient centralized monitoring and management of the grid.

If a leader fails, the embodiments contemplate another server computer in the failed leader's subgroup automatically assuming the role of leader. The new leader assumes the responsibility for reporting the health and availability of the server computers in the subgroup including the new leader itself and the failed old leader. The integrity of the hierarchy is maintained automatically. Further, the master catalog server is notified of the failure of the old leader (as it would be with the failure of any server computer in the working group) in no more than two hops of messages. In conventional systems, there could be many hops and associated delay before the centralized monitoring facility determined that a server computer in the working group failed. In such conventional systems, not only would there be delay in the centralized facility being notified of the failed server computer, but also there would be increased overhead and inefficiency with the multiple hops. Embodiments of the current invention reduce the number of hops that would occur when a server computer in the working group fails and, as before, increases efficiency by decreasing overhead.

Embodiments of the current invention also contemplate that if the master catalog server fails, one of the other catalog servers in the centralized facility (standby catalog servers) assumes the role of master catalog server. The system contemplated by embodiments therefore provides for redundancy and backup throughout all tiers of the system with the failure of no single server computer being catastrophic. Further, the failure of server computers in the working group are monitored and managed with less hops, less overhead, and greater efficiency than in known systems.

Embodiments of the current invention contemplate all of the following steps necessary for creation and maintenance of the grid, being accomplished automatically and without the need for human intervention: the organization of the server computers into the working group, the assignment or division of the server computers into their respective subgroups, the election of leaders, the election of new leaders where existing leaders fail, the selection of the master catalog server, and the selection of a new master catalog server from the standby catalog servers where the master catalog server fails. This automation decreases the amount of system resources that must be dedicated to overhead management and monitoring, and therefore increasing the overall efficiency of the grid. The labor savings from this aspect of the proposed invention also represents significant cost savings.

The system contemplated by embodiments of the current invention is also highly scalable. Embodiments can be implemented with working groups of as few as three or four computers, or as many as several thousand. Regardless of the number of server computers in or added to the working group, embodiments allow the grid to be quickly established or modified with minimal system resources and overhead. The efficiency gains over known systems and achieved by embodiments of the current invention are significant regardless of whether the embodiments are implemented with a handful of server computers or thousands.

Figure 1:
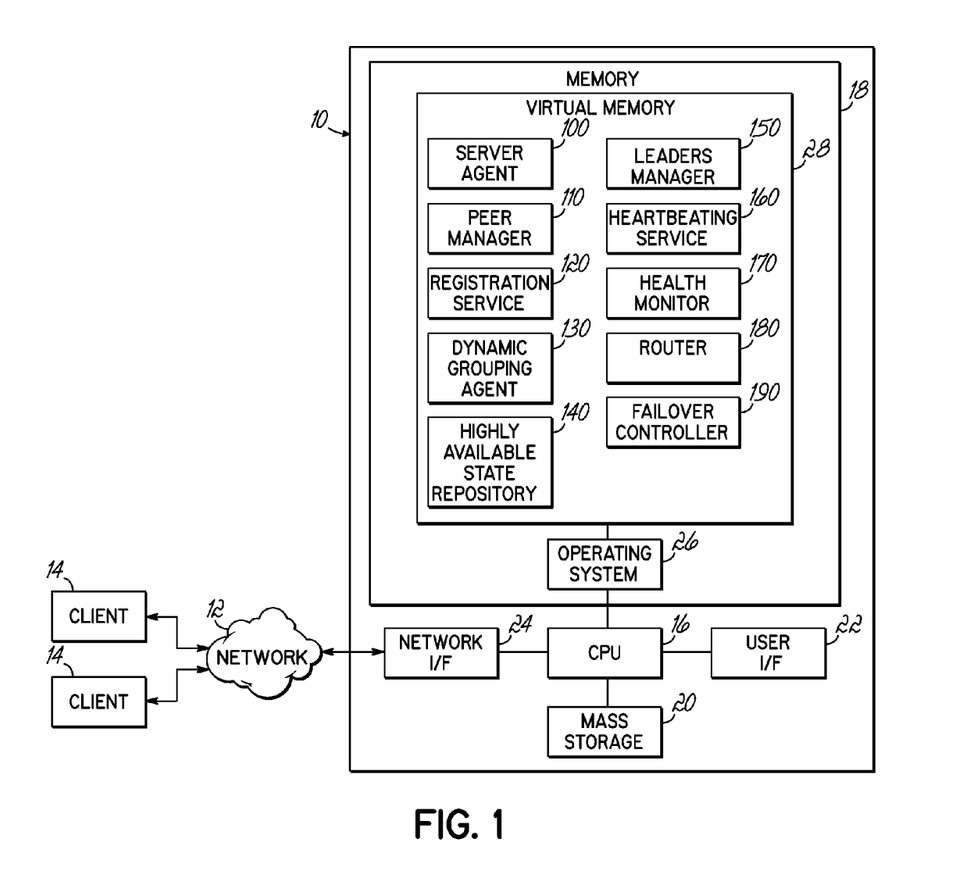
FIG. 1 shows an exemplary server computer suited for implementation within a distributed computing system that is consistent with an embodiment of the present invention.

Turning now to the Drawings, wherein like numbers denote like parts throughout the several views, FIG. 1 illustrates an exemplary apparatus, or a computer 10, within which embodiments of the invention may be realized. The computer 10 in the illustrated embodiment is implemented as a server or multi-user computer system that is coupled via a network 12 to one or more client computers 14. For the purposes of the illustrated embodiment, each computer 10, 14 may represent practically any type of computer, computer system or other programmable electronic device. Moreover, each computer 10, 14 may be implemented using one or more networked computers, e.g., in a cluster or other distributed computing system. In the alternative, aspects of the invention may be implemented within a single computer or other programmable electronic device, such as a desktop computer, a laptop computer, a handheld computer, a cell phone, a set top box, a non-networked, standalone configuration, etc.

The computer 10 typically comprises a central processing unit 16 that includes at least one microprocessor coupled to a memory 18. Memory 18 may represent the random access memory (RAM) devices comprising the main storage of the computer 10, as well as any supplemental levels of memory: cache memories, non-volatile or backup memories (programmable or flash memories), read-only memories, etc. In addition, memory 18 may be considered to include memory storage physically located elsewhere in the computer 10, e.g., any cache memory in a processor in CPU 16, as well as any storage capacity used as a virtual memory, as stored on a mass storage device 20 or on another computer coupled to the computer 10.

The computer 10 also typically receives a number of inputs and outputs for communicating information externally. For interface with a user or operator, the computer 10 typically includes a user interface 22 incorporating one or more user input devices (e.g., a keyboard, a mouse, a trackball, a joystick, a touchpad, and/or a microphone, etc.) and a display (e.g., a CRT monitor, an LCD display panel, and/or a speaker, etc.) Otherwise, user input may be received via another computer or terminal.

For additional storage, the computer 10 may also include one or more mass storage devices 20, such as a floppy or other removable disk drive, a hard disk drive, a direct access storage device (DASD), an optical drive (a CD drive, a DVD drive, etc.), and/or a tape drive, among others. Furthermore, the computer 10 may include an interface 24 with one or more networks 12 (e.g., a LAN, a WAN, a wireless network, and/or the Internet, and so on) to permit the communication of information with other computers and electronic devices. It should be appreciated that the computer 10 typically includes suitable analog and/or digital interfaces between CPU 16 and each of components 18, 20, 22 and 24 as is well known in the art. Other hardware environments are contemplated within the context of the embodiments of the invention.

The computer 10 operates under the control of an operating system 26 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to the computer 10 via network 12, e.g., in a distributed or client-server computing environment, whereby the processing required to implement the functions of a computer program may be allocated to multiple computers over a network.

Within the virtual memory 28 are software protocols 100, 110, 120, 130, 140, 150, 160, 170, 180, 190 that operate to implement embodiments of the present invention and that distinguish it from known systems. These protocols are present in every server in the working group, however only certain protocols are used by any given server as dictated by the role it plays in the working group; i.e., whether the server is acting as the master catalog server, a standby catalog server, a leader, or one of the servers in a subgroup. Thus, any server in the working group could, if necessary, assume any of the roles characteristic of the embodiments, the prerequisite software protocols already being inherently present in every server.

The server agent 100 acts in a subgroup server to communicate with the centralized facility, register the server with the registration service 120 hosted in the catalog servers, and receive instructions from the dynamic grouping agent 130 and failover controller 190.

The peer manager 110 acts in a subgroup server to communicate with the other servers in the respective subgroup to enable election of a leader and assess the health of other servers in the subgroup.

The registration service 120 acts in the master catalog server to receive registration information from the subgroup servers. The registration service informs the master catalog server that the registering subgroup server is now part of the working group, that the registering subgroup server is available, and to what extent the registering subgroup server is available to perform processing tasks.

The dynamic grouping agent 130 acts in the master catalog server to receive input from the registration service 120, organize registering servers into a management group, and provide identity information to each server through the server agent 100.

The highly available state repository 140 acts in the master catalog server to record all servers' metadata and group data. The highly available state repository is replicated in the catalog servers of the catalog server cluster. One of the catalog servers in the catalog server cluster is elected as the master catalog server. The master catalog server receives all message traffic from the working group servers. If the current master catalog server fails, a new master catalog server is elected from the standby catalog servers in the catalog server cluster.

The leaders manager 150 acts only in the master catalog server to manage the leaders. Each subgroup has an elected leader. If this leader fails, another leader will be elected through peer managers 110 in the respective subgroup.

The heartbeating service 160 acts in the master catalog server to periodically ping every leader to detect if the leader is still available. If a leader is detected as unavailable, the heartbeating service will extract all servers in the subgroup and then pings all servers in the subgroup until a new leader is elected or selected for the subgroup.

The health monitor 170 acts in the master catalog server to monitor all working group servers' health through reports from the leaders. The health monitor takes appropriate remedial action if any server in the working group is detected as unavailable.

The router 180 acts in every server to insure that all management traffic is routed into the master catalog server within the catalog server cluster.

The failover controller 190 acts in every server to control catalog server failover as well as server failover.

In general, the routines executed to implement the embodiments of the invention, whether implemented as part of an operating system or a specific application, component, program, object, module or sequence of instructions, or even a subset thereof, will be referred to herein as algorithms, program code, software protocols, or simply programs. Program code typically comprises one or more instructions that are resident at various times in various memory and storage devices in a computer; when read and executed by one or more processors in a computer they cause that computer to perform the steps necessary to execute steps or elements embodying the various aspects of the invention.

Moreover, while the embodiments of the current invention have and hereinafter will be described in the context of fully functioning computers and computer systems, those skilled in the art will appreciate that various embodiments of the invention are capable of being distributed as a program product in a variety of forms, and that the embodiments apply equally regardless of the particular type of computer readable media used to actually carry out the distribution. Examples of computer readable media comprise, but are not limited to tangible, recordable type media and transmission type media. Examples of tangible, recordable type media include volatile and non-volatile memory devices, floppy and other removable disks, hard disk drives, magnetic tape, and optical disks (CD-ROMs, DVDs, etc.). Examples of transmission type media include digital and analog communication links.

In addition, various program code described hereinafter may be identified based upon the application within which it is implemented in a specific embodiment of the invention. However, it should be appreciated that any particular program nomenclature that follows is used merely for convenience, and thus the embodiments should not be limited to use solely in any specific application identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments are not limited to the specific organization and allocation of program functionality described herein.

Those skilled in the art will recognize that the exemplary environment illustrated in FIG. 1 is not intended to limit embodiments of the present invention. Indeed, those skilled in the art will recognize that other alternative hardware and/or software environments may be used without departing from the scope of the embodiments.

Figure 2:
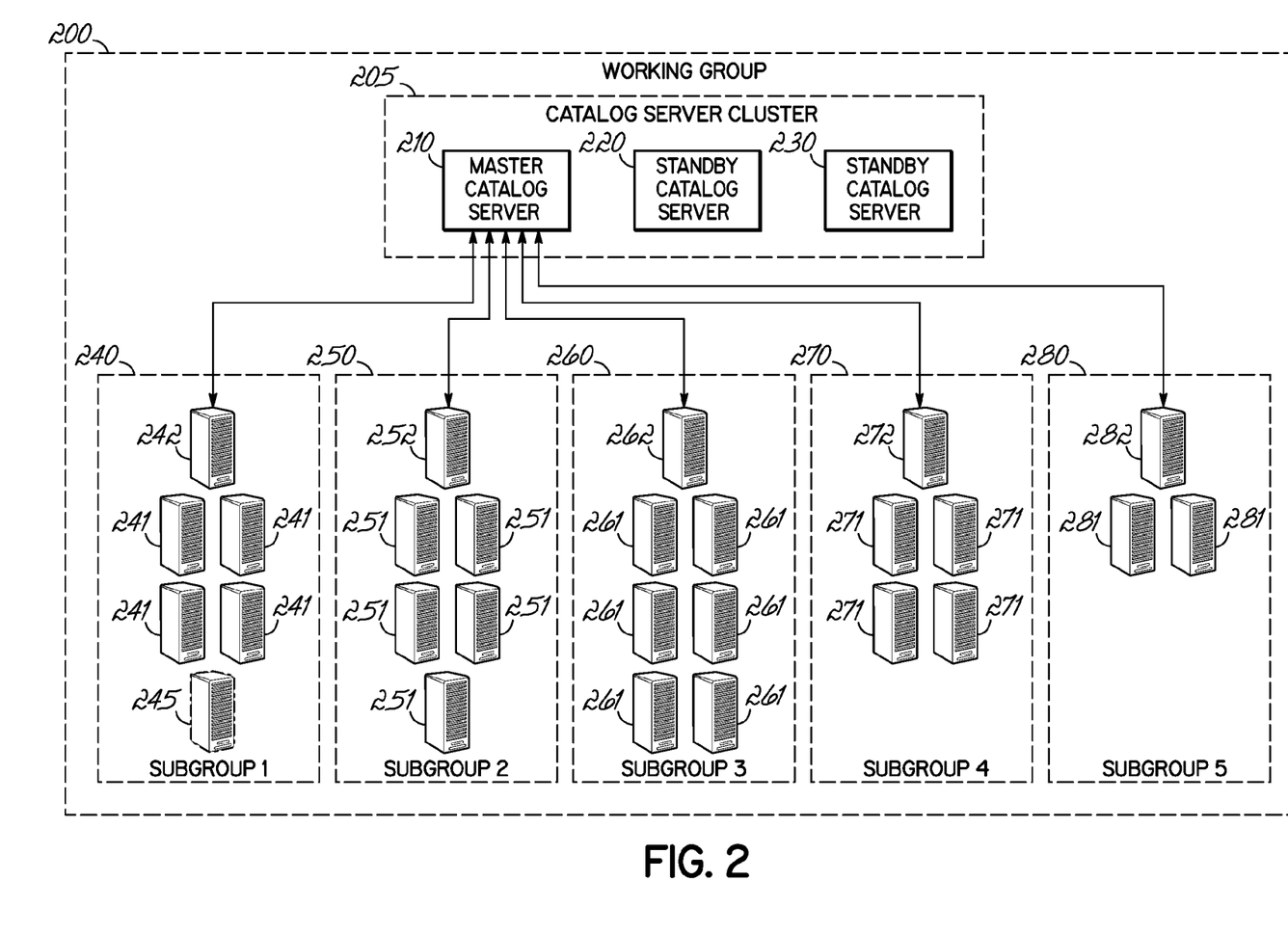
FIG. 2 shows the network topology that includes servers organized into subgroups having a leader selected to monitor and manage each server in its respective subgroup. The leaders report to and are managed by the master catalog server that exists in the catalog server cluster along with standby catalog servers.

FIG. 2 illustrates an exemplary network topology implemented by embodiments of the present invention. The servers 210, 220, 230, 241, 242, 251, 252, 261, 262, 271, 272, 281, and 282 in the working group 200 are selected into subgroups 240, 250, 260, 270, and 280. The servers 241, 242, 251, 252, 261, 262, 271, 272, 281, and 282 in each subgroup 240, 250, 260, 270, 280 are individually managed by a leader server 242, 252, 262, 272, and 282. The leaders 242, 252, 262, 272, and 282 monitor the status of the servers 241, 242, 251, 252, 261, 262, 271, 272, 281, and 282 in their respective subgroups 240, 250, 260, 270, and 280 and report this information to the catalog server cluster 205.

The catalog server cluster 205 is typically housed or physically located in a centralized management facility. The catalog server cluster 205 consists of the master catalog server 210 and standby catalog servers 220 and 230. The reporting information provided by the leaders 242, 252, 262, 272, and 282 is routed to the master catalog server 210 which performs the monitoring and management functions for the working group 200. The standby catalog servers 220 and 230 act as backups for the master catalog server 210, assuming its function if it fails.

The advantages realized by embodiments of the present invention are demonstrated by there being no more than two hops of ping messages between any server 241, 242, 251, 252, 261, 262, 271, 272, 281, and 282 and the catalog server cluster 205 housed in a centralized management facility. This decreases the total number of ping messages the system must generate to manage and monitor the entire system and, therefore, decreases the amount of system resources that must be dedicated to overhead management.

Further, the small number of hops between any server 241, 242, 251, 252, 261, 262, 271, 272, 281, and 282 and the catalog server cluster 205 makes the system responsive to failovers and availability changes within the system; i.e., monitoring, management, and control messages travel faster as they have less hops to make.

Figure 3:
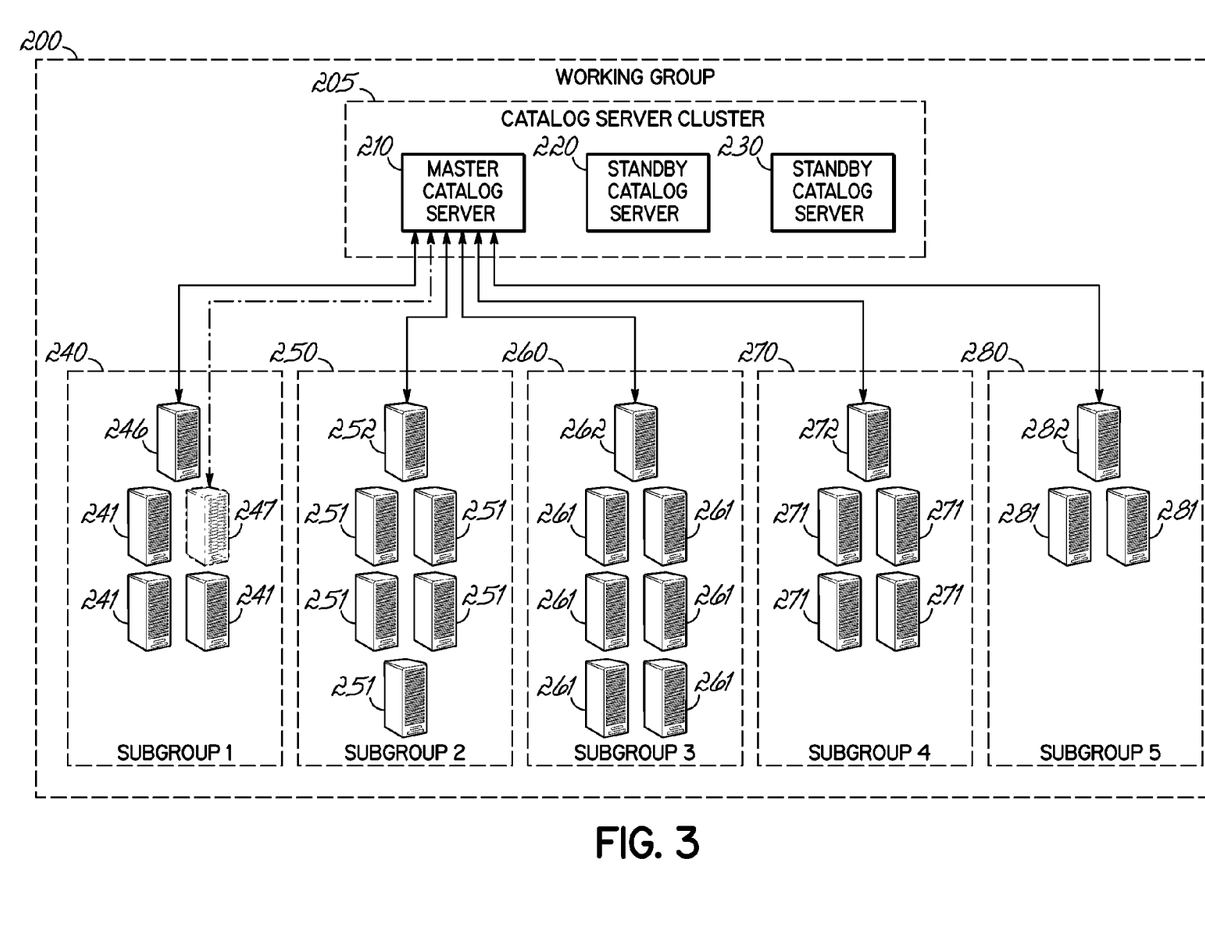
FIG. 3 shows the network topology contemplated by embodiments of the present invention wherein a leader has failed, its role having been assumed by another server in the subgroup that has thereby become the new leader for that subgroup and is now communicating directly with the master catalog server and reporting on behalf of the subgroup.

FIG. 3 illustrates the exemplary network topology of FIG. 2 wherein a leader 247 in one of the subgroups 240 has failed. A new leader 246 is selected within the subgroup 240 to assume the function of the failed leader 247. The new leader 246 is automatically selected or elected by the other servers 241 in the subgroup 240 upon the failure of the old leader 247. The new leader 246 registers its status as leader to the master catalog server 210 in the catalog server cluster 205 and reports that the old leader 247 has failed. The new leader 246 now monitors the other servers 241 and 247 in its subgroup 240 and reports the status of these servers 241 and 247 directly to the master catalog server 210.

Figure 4:
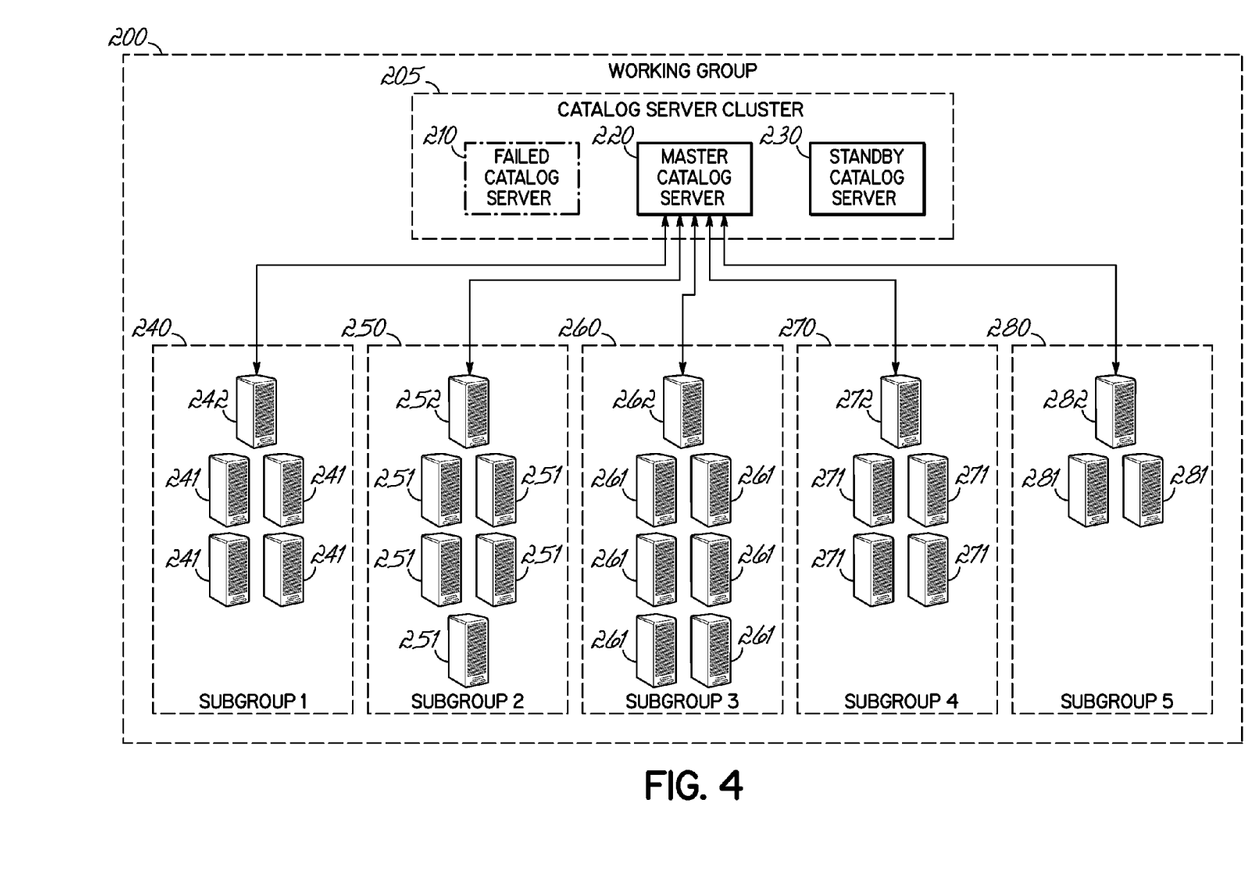
FIG. 4 shows the network topology contemplated by embodiments of the present invention wherein the master catalog server has failed, its role being assumed by one of the standby catalog servers, the leaders now reporting to this new master catalog server.

FIG. 4 illustrates the exemplary network topology of FIG. 2 wherein the master catalog server 210 has failed. The role of the failed master catalog server 210 is automatically assumed by one of the standby catalog servers 220, which becomes the new master catalog server 220. The failure of the old master catalog server 210 is automatically registered with the new master catalog server 220. The new master catalog server 220 is automatically registered with all of the servers 210, 230, 241, 242, 251, 252, 261, 262, 271, 272, 281, and 282 in the working group 200. The leaders 242, 252, 262, 272, and 282 automatically route status and system messages to the new master catalog server 220 once the new master catalog server 220 is registered as the master catalog server.

FIGS. 5, 6, 7, 8, 9, 10, 11 and 12 illustrate the software protocols typically present in embodiments of the invention. These software protocols enable and support the automatic grouping, organization, and management inherent in embodiments of the present invention and that provide the embodiments with efficiency gains over conventional systems.

Figure 5:
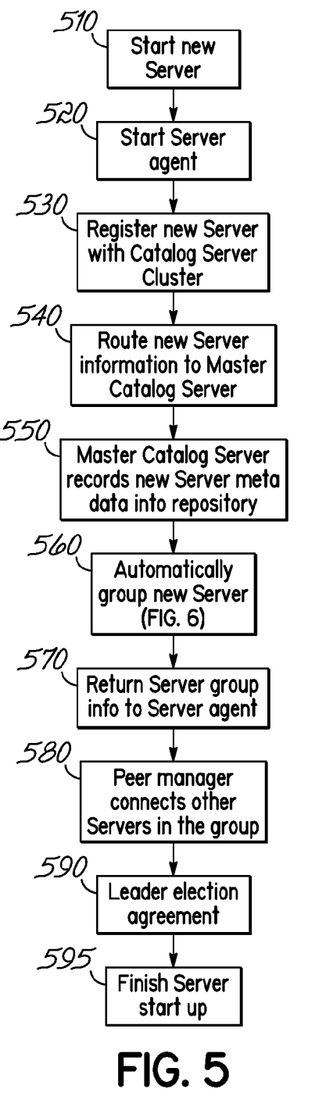
FIG. 5 shows the software protocol that runs when a new server is added to the working group and that automatically registers that server with the catalog servers.

FIG. 5 illustrates the software protocols that operate within a new server 245 added to the working group 200 and the master catalog server 210 to register the new server 245 within the working group 200. When the new server 245 begins operation at step 510, the server agent 100 will also begin at step 520. The server agent 100 will register the new server 245 with the catalog server cluster 205 by routing at step 530 a ping message with metadata to the catalog server cluster 205. The metadata includes information regarding the server 245, its status, and its availability.

The ping message with metadata is routed at step 540 to the master catalog server 210 within the catalog server cluster 205. The master catalog server 210 records at step 550 the metadata from the new server 245 into the master catalog server's repository. The new server 245 is automatically grouped at step 560 (FIG. 6) into an available subgroup 240. At step 570 the master catalog server 210 sends to the server agent 100 of the newly added server 245 information regarding the subgroup 240 to which the newly added server 245 is assigned.

The peer manager 110 of the newly added server 245 interacts at step 580 with the peer managers 110 of the other servers 241 and 242 in the subgroup 240 such that all servers 241, 242, and 245 in the subgroup 240 possess the necessary registration information regarding all other servers 241, 242, 245 in the subgroup 240. If a leader 242 is not already elected for the subgroup 240, a leader 242 is selected at step 590 by the subgroup 240 based on some criteria such as selection of the first server added to the subgroup or the lowest numbered server within the subgroup 240. The protocol then ends at step 595.

Figure 6:
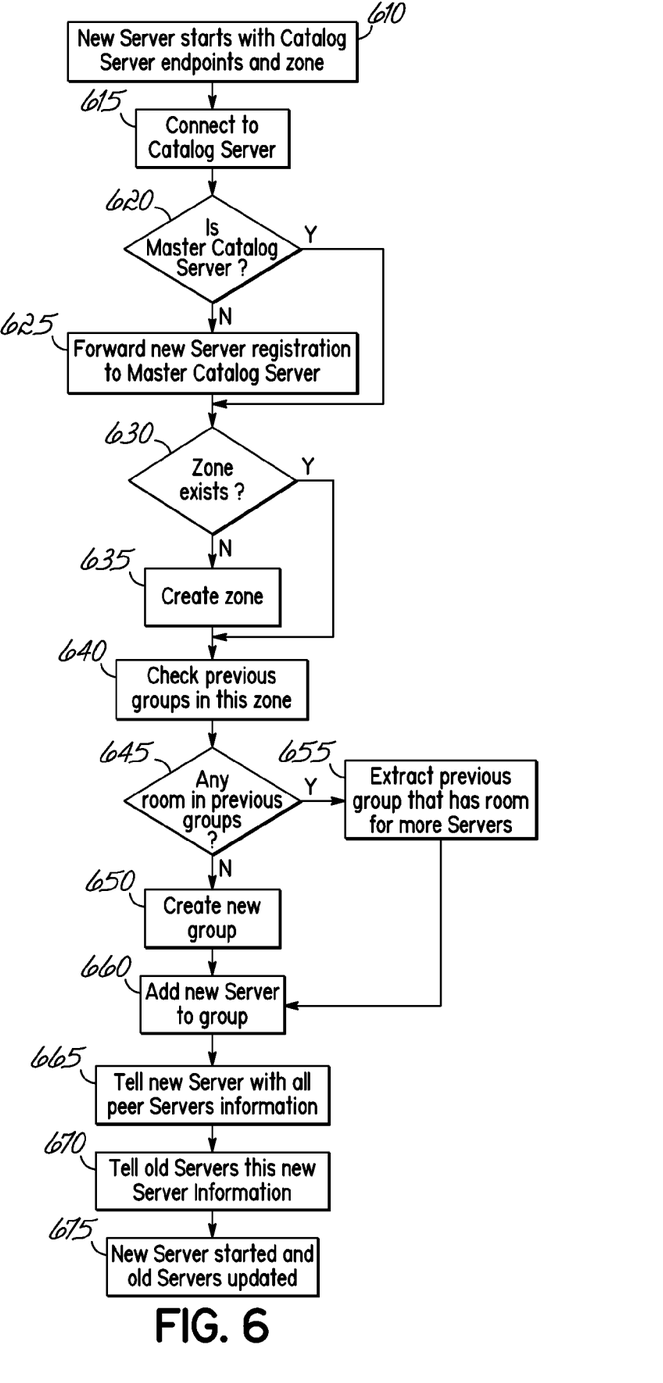
FIG. 6 shows the software protocol that runs to automatically register a new server with the other servers in its subgroup.

FIG. 6 illustrates the software protocols that operate at step 560 of FIG. 5 within the servers 241, 242 of a subgroup 240 to automatically register a newly added server 245 with the other servers in the subgroup 240. Once a newly added server 245 starts, it obtains information at step 610 regarding the size of the working group 200 to which it is a part. The newly added server 245 will attempt to connect at step 615 with the master catalog server 210. The newly added server 245 will send ping messages to a neighboring server 241 within the working group 200 and determine at step 620 if the neighboring server 241 is the master catalog server 210.

If the neighboring server is the master catalog server 210 as determined at step 620, the newly added server 245 will communicate directly with the master catalog server 210 to determine at step 630 if a zone presently exists within the master catalog server's 210 registration service 120 corresponding to the network or geographic zone the newly added server 245 is in. If the neighboring server 241 is not the master catalog server 210 as determined at step 620, the newly added server 245 will forward at step 625 its registration information through the neighboring server 241 so that the newly added server 245 can identify and communicate directly with the master catalog server and then proceed to step 630.

If the appropriate network zone does not exist as determined at step 630, it is created at step 635 within the master catalog server's 210 registration service 120 and the protocol proceeds to step 640. If the appropriate zone does exist, the system proceeds to step 640. The protocol will then obtain at step 640 information regarding the subgroups 240, 250, 260, 270, and 280 in the zone and determine at step 645 if there is room in the existing subgroups 240, 250, 260, 270, and 280 for a new server 245. If there is room in the existing subgroups 240, 250, 260, 270, and 280 as determined at step 645, the system will determine at step 655 which subgroups 240, 250, 260, 270, and 280 have room for a new server and the newly added server 245 will be assigned at step 660 to the appropriate subgroup 240 with available room based on some criteria (FIG. 7) which can be established.

If there is not room in the existing subgroups 240, 250, 260, 270, and 280 as determined at step 645, a new group will be created at step 650 and the newly added server 245 will be assigned to that new subgroup 240 at step 660. The newly added server 245 will be provided at step 665 with the identity information regarding all other servers 241 and 252 in the assigned subgroup 240. All existing servers 241 and 242 in the subgroup that the new server 245 is assigned to will be notified at step 670 of the assignment and identity of the newly added server 245. The newly added server 245 is then ready to operate as a constituent part of the working group 200 and both the master catalog server 210 and other servers 241 and 242, including the leader 242, are aware of the availability of the newly added server at step 675.

Figure 7:
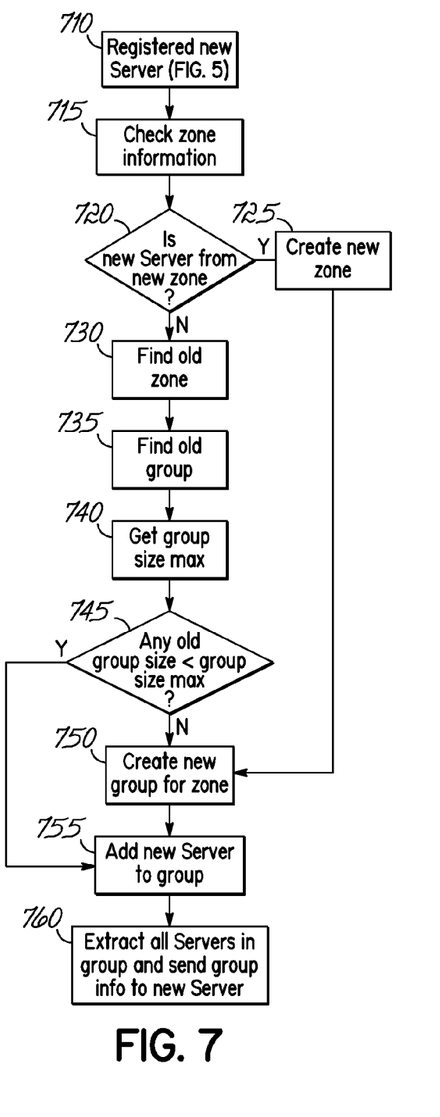
FIG. 7 shows the software protocol that automatically groups a new server into an available subgroup.

FIG. 7 illustrates the software protocols that operate within the master catalog server 210 to automatically group at step 660 a new server 245 into an available subgroup 240. The new server registers at steps 625 and 710 with the master catalog server 210. The master catalog server 210 checks at step 715 the zone information for all of the servers 210, 220, 230, 241, 242, 251, 252, 261, 262, 271, 272, 281, and 282 currently in the working group 200. If the new server 245 is from a zone for which existing servers 210, 220, 230, 241, 242, 251, 252, 261, 262, 271, 272, 281, and 282 in the working group 200 are in as determined in step 720, the master catalog server 210 determines at step 735 which subgroups 240, 250, 260, 270, and 280 are available within this zone. The maximum allowed size for any subgroup will be obtained at step 740 and the system will determine at step 745 if any of the existing subgroups 240, 250, 260, 270, and 280 are smaller than the maximum group size.

If there is no subgroup 240, 250, 260, 270, and 280 smaller than the maximum group size as determined at step 745, a new subgroup 240 will be created at step 750 and the new server 245 will be assigned at step 755 to this new subgroup 240. If there are subgroups 240, 250, 260, 270, and 280 within the zone smaller than the maximum group size as determined at step 745, the new server 245 will be assigned at step 755 to one of these available subgroups 240, 250, 260, 270, and 280 based on some criteria that can be defined. The master catalog server 210 will then extract information regarding the servers 241 and 242 in the subgroup 240 and at step 760 route this information to the newly added server 245. If the newly added server 245 is from a new zone as determined at step 720, the new zone is created at step 725 within the master catalog servers' 210 registration service 120 and a new group 240 is created at step 750; the new server 245 is assigned at step 755 to this new subgroup 240, the system continuing from step 755 to step 760, described above.

Figure 8:
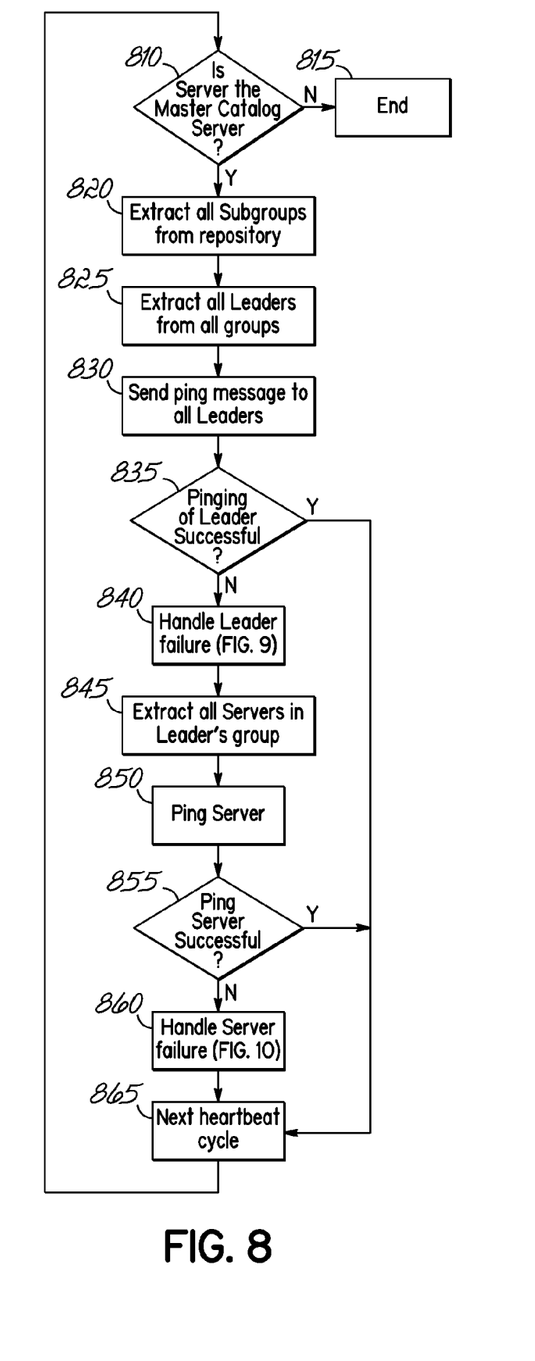
FIG. 8 shows the software protocol that enables the master catalog server to automatically obtain from the leaders the status of the servers in each leaders' subgroup.

FIG. 8 illustrates the software protocols of the heartbeating service 160 that operate within the master catalog server 210 to assess the health, availability, and status of the leaders 242, 252, 262, 272, and 282 and necessarily respond if there are any failed leaders 247. This protocol first determines at step 810 if the server 247 in which it is operating is the master catalog server 210, and if not, the protocol ends at step 815 as it only needs to operate where the server is the master catalog server 210. If the server 210 is the master catalog server 210 as determined at step 810, the protocol will extract at step 820 information regarding all subgroups 240, 250, 260, 270, and 280 from the registration service 120 and from this information, extract at step 825 the identity of all of the leaders 242, 252, 262, 272, and 282. The protocol will then send at step 830 a ping message to all of the leaders 242, 252, 262, 272, and 282. The actual pinging is performed by the leaders manager 150. At step 835 if the pinging of all of the leaders 242, 252, 262, 272, and 282 from step 830 is successful, such that there are no problems or failures with any of the leaders 242, 252, 262, 272, and 282, the protocol ends, and at step 865 operates again from the beginning at the next cycle designated to assess the status of the leaders 242, 252, 262, 272, and 282.

At step 835 if the pinging of the leaders 247, 252, 262, 272, and 282 is not successful from step 830, such that some leaders 247 have not responded due to failure, the protocol will initiate at step 840 the server failure protocol (FIG. 9) with respect to the failed leaders 247 and then proceed to extract at step 845 information regarding all of the servers 241, 246, and 247 in the failed leader's 247 subgroup 240. The protocol will then send at step 850 ping messages to all of the servers 241, 246, and 247 in the failed leader's 247 subgroup 240. If the pinging from step 850 of the servers 241, 246, and 247 in the failed leader's 247 subgroup is successful, as determined at step 855, the protocol ends and at step 865 operates again from the beginning at the next cycle designated to assess the status of the leaders 246, 252, 262, 272, and 282.

If the pinging from step 850 of the servers in the failed leader's 247 subgroup 240 is not successful, as determined at step 855, such that some servers 247 in the subgroup 240 have not responded due to failure, the protocol will initiate at step 860 the server failure protocol (FIG. 10) with respect to the failed servers 247 and then end, at step 865 operating again from the beginning at the next cycle designated to assess the status of the leaders 246, 252, 262, 272, 282.

Figure 9:
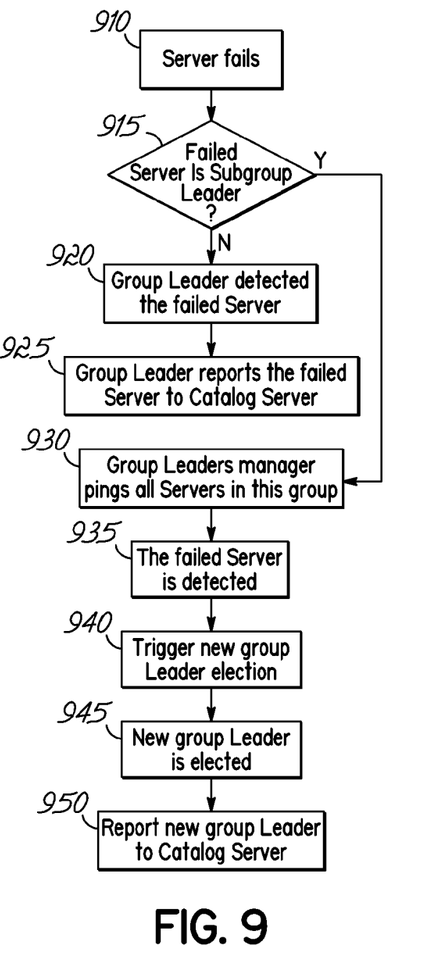
FIG. 9 shows the software protocol that automatically reports a server failure to the master catalog server.

FIG. 9 illustrates the failover controller 190 that operates within the master catalog server 210 to report and manage a server failure. Once a server 247 fails at step 910, the server reporting this to the master catalog server 210 will either be a leader 242 or not be a leader 241 as determined at step 915. If the failed server 247 is not a group leader 246 as determined at step 915, then that failed server's 247 leader 246 will detect at step 920 the failure of the server 247, the failure of the server 247 will be reported at step 925 to the master catalog server 210 by the leader 246 and the protocol will end. If the failed server 247 is a leader 247 as determined at step 915, then failure of this leader 247 will be detected when the leader's manager 150 pings the leaders 246, 252, 262, 272, 282 as part of the heartbeating service 160.

The failure of the leader 247 will prompt the leader manager 150 and the heartbeating service 160 to send at step 930 ping messages to all of the servers 241, 246, and 247 in the failed leader's 247 subgroup 240. This pinging will allow the detection and determination at step 935 of the failed leader 247. The failover controller 190 will then trigger at step 940 the election of a new leader 246 within the subgroup 240. Once the subgroup 240 has elected at step 945 a new leader 246, the identity of the new leader 246 is reported at step 950 to the registration service 120 of the master catalog server 210.

Figure 10:
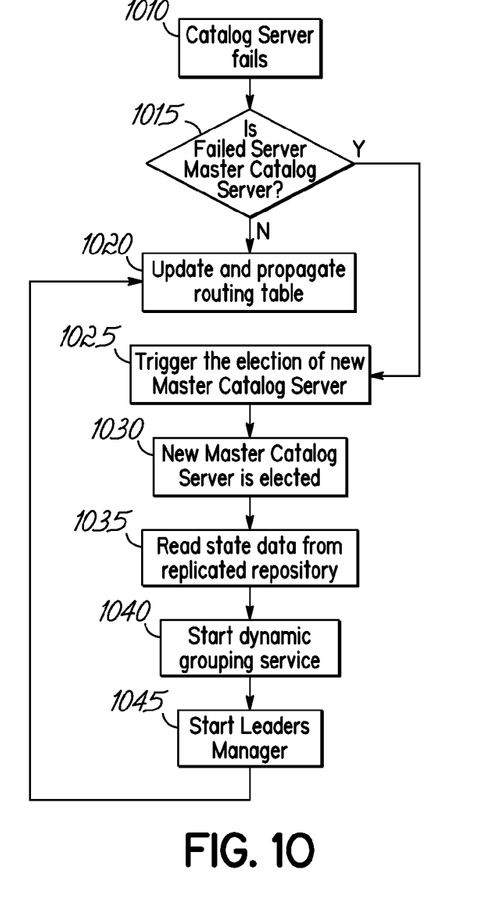
FIG. 10 shows the software protocol that automatically selects a new master catalog server from among the standby catalog servers upon the failure of the current master catalog server.

FIG. 10 illustrates the protocol that operates within the catalog servers 210, 220, and 230 to designate a new master catalog server 220 from among the standby catalog servers 220 and 230 upon the failure of the current master catalog server 210. Upon the failure of a catalog server at step 1010, the protocol determines at step 1015 if the failed catalog server is the master catalog server 210. If the failed catalog server 210 is not the master catalog server 210 as determined at step 1015, then the master catalog server 210 updates at step 1020 its registration information to reflect that one of the standby catalog servers 220 and 230 has failed, the master catalog server 210 routes at step 1020 this information to the other servers 220, 230, 241, 242, 251, 252, 261, 262, 271, 272, 281, and 282 in the working group 200, and the protocol ends.

If the failed server 210 is the master catalog server 210 as determined at step 1015, the standby catalog servers 220 and 230 will trigger at step 1025 the election of a new master catalog 220 server from among the standby catalog servers 220 and 230, the criteria for which may be defined. Once the new master catalog server 220 is elected at step 1030, the new master catalog server 220 obtains at step 1035 data regarding management of the working group 200 from the highly available state repository 140 and then initiates at step 1040 the dynamic grouping service 130 and the leaders manager 150 at step 1045 necessary to perform as the new master catalog server 220. The system then proceeds to step 1020, the master catalog server both updating its registration information to reflect that one of the standby catalog servers 220 and 230 has failed and routing this information to the other servers 220, 230, 241, 242, 251, 252, 261, 262, 271, 272, 281, and 282 in the working group 200, and the protocol then ends.

Figures 11, 12:
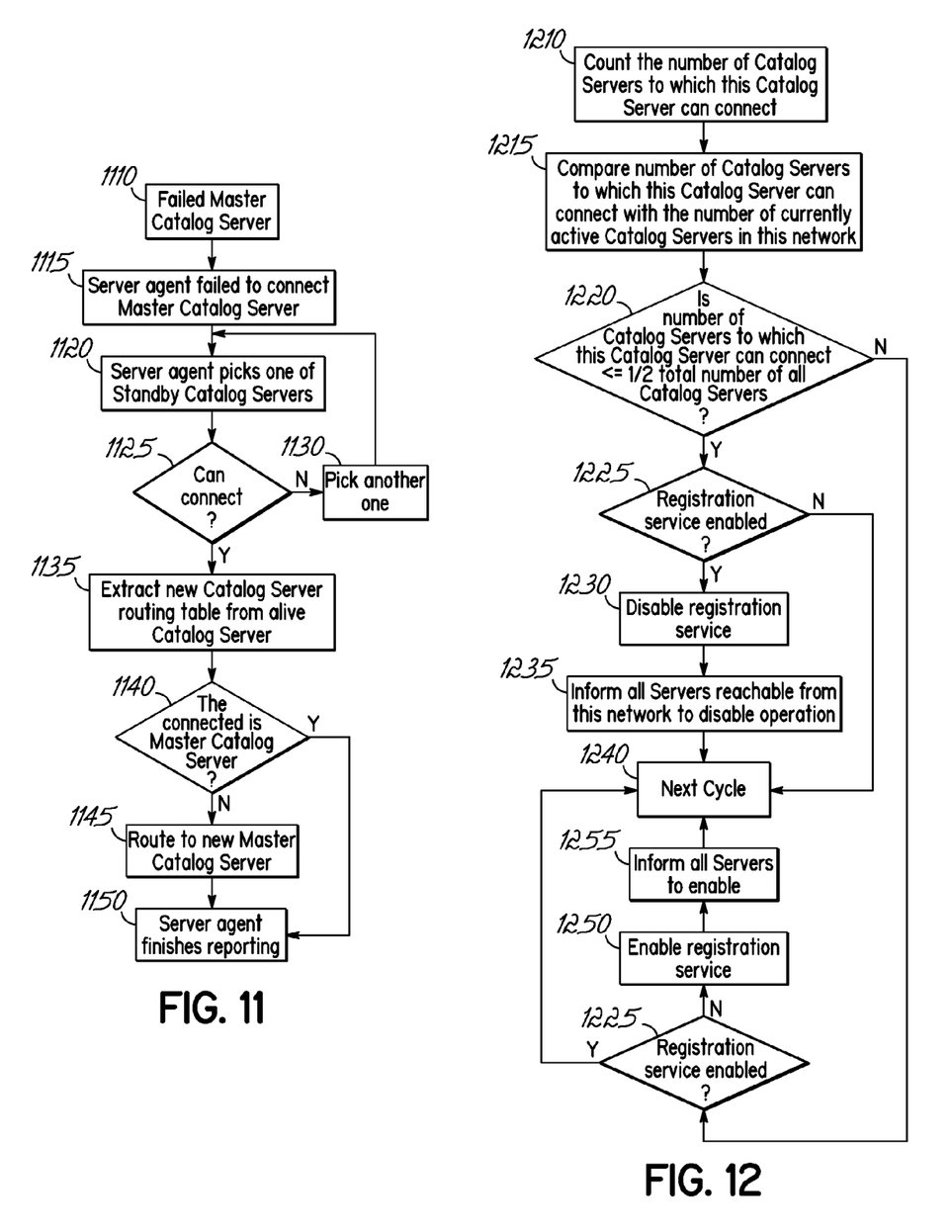
FIG. 11 shows the software protocol that automatically routes the leaders reporting to the new master catalog server upon the failure of the existing master catalog server.
FIG. 12 shows the software protocol that, upon a division in the network, automatically disables some of the functionality of the servers unable to connect to the master catalog server to insure that there is only one master catalog server operating at any one given time in the working group.

FIG. 11 illustrates the protocol that operates within servers 210, 220, 230, 241, 242, 251, 252, 261, 262, 271, 272, 281, and 282 of the working group 200 to automatically reassign the leaders 242, 252, 262, 272, 282 to communicate with the new master catalog server 220 upon the failure of the master catalog server 210. Upon the failure at step 1110 of the master catalog server 210, the server agents 100 of the servers 220, 230, 241, 242, 251, 252, 261, 262, 271, 272, 281, and 282 in the working group 200 will fail at step 1115 to connect to the failed master catalog server 210. The server agents 100 will then select at step 1120 one of the standby catalog servers 230, and attempt to connect at step 1125 to this standby catalog server via ping messages. If the catalog server pinged 230 does not connect at step 1125 with the server agents 100, the server agents 100 will select at step 1130 one of the other catalog servers 220 and attempt to connect at step 1125 to this standby catalog server, the process cycling through steps 1120, 1125 and 1130 until an available catalog server 220 is pinged at step 1125. Once an available catalog server 220 is pinged at step 1125, the server agents 100 will extract at step 1135 new routing information from the available catalog server 220, and then determine at step 1140 if the available catalog server 220 is the new master catalog server.

If the available catalog server 220 to which the server agents 100 are connected is the new master catalog server 220 as determined at step 1140, the server agents 100 will finish reporting at step 1150 to their new master catalog server 220 which is recognized by the server agents 100 as such and the protocol will end. If the available catalog server 230 to which the server agents 100 are connected is not the new master catalog server 220 as determined at step 1140, the server agents 100 will use the extracted routing information to determine which catalog server 220 is the new master catalog server 220, route at step 1145 their messages and reports to the new master catalog server 220, finish reporting at step 1150 to their new master catalog server 220 which is recognized by the server agents 100 as such, and the protocol will end.

FIG. 12 illustrates the software protocol that, upon a division in the network, automatically disables some of the functionality of the servers 220, 230, 241, 242, 251, 252, 261, 262, 271, and 272 unable to connect to the master catalog server 210 to insure that there is only one master catalog server 210 operating at any one given time in the working group 200. Where a split or division occurs in the network to which the servers 220, 230, 241, 242, 251, 252, 261, 262, 271, and 272 in the working group 200 are connected, there is the potential for some servers 220, 230, 241, 242, 251, 252, 261, 262, 271, and 272 in the working group 200 to be unable to connect to the master catalog server 210. Were these servers to connect to one or more different and new master catalog servers 220, the grid would experience a brain split, or division, where one part of the grid is unable to connect to the other with significant detrimental impacts. Embodiments of the present invention avoid these potential problems by automatically preventing those servers 220, 230, 241, 242, 251, 252, 261, 262, 271, and 272 unable to connect to the master catalog server 210 from connecting to a new master catalog server 220 and automatically disabling all functions in these severed servers, except those related to retrieval functions-information can be retrieved from these servers, but processing tasks cannot be assigned to them.

FIG. 12 illustrates the software protocol on all of the catalog servers 210, 220, and 230. The software protocol runs on cycles of predetermined time periods. The number of active catalog servers 210 and 220 to which a catalog server 230 can connect will be determined at step 1210. This number is compared at step 1215 to the number of active catalog servers 210 and 220 in the grid. If the catalog server 230 is able to connect to more than one-half of the catalog servers 210 and 220 in the grid as determined at step 1220, then it will be determined at step 1225 whether the registration service 120 of this catalog server 230 is enabled and if it is, the protocol will end until the next cycle beginning at step 1240. If the registration service 120 of this catalog server 230 is not enabled as determined at step 1225, the registration service 120 of the catalog server 230 will be enabled at step 1250 and the registration service 120 of all servers 241, 242, 251, 252, 261, 262, 271, 272, 281, and 282 to which this catalog server 230 can connect will be enabled as well at step 1255. The protocol will then end until the next cycle beginning at step 1240.

If a catalog server 230 is unable to connect to more than one-half of the catalog servers 210 and 220 in the grid 200 as determined at step 1220, then this server 230 is in a minority portion of the distributed network and is unable to connect to the master catalog server 210. In this situation, if the registration service 120 of this catalog server 230 is enabled as determined at step 1225, the registration service 120 will be disabled at step 1230 and all servers 241, 242, 251, 252, 261, 262, 271, 272, 281, and 282 to which this catalog server 230 can connect will be instructed to disable operations at step 1235, other than basic read functions. The protocol will then end until the next cycle beginning at step 1240. If the registration service 120 of this catalog server 230 is not enabled as determined at step 1225, the protocol will then end until the next cycle beginning at step 1240.

In operation, embodiments of the present invention include specialized mechanisms for implementing the grid. Embodiments facilitate a networked group of distributed server computers working together as a grid to manage the availability and health of their individual servers in an efficient, effective, and responsive way.

According to one aspect of the invention, a large number of servers are divided into smaller subgroups. Each group elects or chooses one of the servers in that group to be the lead server computer. The lead server computer in each group is managed or controlled by a master catalog server. The master catalog server is hosted in a centralized facility where monitoring and management of the entire network grid occurs.

This first aspect of the invention contemplates the formation of the system hierarchy automatically without the need for human intervention. This aspect makes the grid computing system highly available and highly scalable while requiring only two hops of messages from the individual servers to a centralized management facility.

This first aspect of the invention also contemplates the computer servers forming themselves into this hierarchical, or tree system automatically without the need for human intervention. This also makes the system highly available and highly scalable since the system is highly responsive. For instance, only two hops may be required before the centralized facility receives the health and availability information for any server in the system.

Another or the same embodiment may include the ability for the Servers in a subgroup to automatically elect a new leader upon the failure of the existing leader.

According to another aspect of the invention, the functionality of the master catalog server exists in other Servers at the centralized management facility which act as standby catalog servers. Upon the failure of the master catalog server, one of the standby catalog servers is automatically selected to act as the new master catalog server and assume the function of the failed master catalog server.

While embodiments of the present invention have been illustrated by a description of various embodiments and while these embodiments have been described in considerable detail, it is not the intention of the Applicants to restrict, or, in any way limit the scope of the appended claims to such detail. The embodiments in its broader aspects is therefore not limited to the specific details, representative apparatus and method, and illustrative example shown and described. Accordingly, departures may be made from such details without departing from the spirit or scope of Applicants' general inventive concept.

What is claimed is:

1. An apparatus comprising:

a plurality of networked server computers automatically configured into a hierarchical architecture of subgroups configured to cooperate to perform a common processing task;

a lead server computer of each subgroup for monitoring and managing operations of other server computers of the subgroup;

a catalog server computer of the plurality of networked server computers in communication with and configured to manage each lead server computer, the catalog server computer including a heartbeating service to periodically ping each lead server computer to detect whether each lead server computer is available, wherein, when a particular lead server computer is detected as unavailable, the heartbeating service determines addresses of the server computers of the subgroup associated with the particular lead server computer and pings the server computers of the subgroup until a new lead server computer is selected for the subgroup; and program code executable by at least one networked server computer of the plurality of networked server computers for automatically configuring the plurality of networked server computers into the hierarchical architecture, wherein a message sent from a networked server computer of the plurality of networked server computers is sent to the catalog server computer in no more than two hops.

2. The apparatus of claim 1, wherein the program code is further configured to automatically select the lead server computer of each subgroup.

3. The apparatus of claim 1, further comprising a plurality of catalog server computers configured to manage each lead server computer.

4. The apparatus of claim 3, wherein one of the plurality of catalog server computers is configured to assume an operation from another catalog server computer.

5. The apparatus of claim 3, wherein the plurality of catalog server computers are collocated.

6. The apparatus of claim 1, wherein the lead server computer is automatically selected by the other server computers of the subgroup.

7. The apparatus of claim 1, wherein the program code is further configured to automatically select the new lead server computer in response to a detected operation affecting lead server computer performance.

8. The apparatus of claim 1, wherein the other server computers of the subgroup are configured to automatically select the new lead server computer in response to a detected operation affecting lead server computer performance.

9. The apparatus of claim 1, wherein a number of server computers in each subgroup ranges from 5 to 200.

10. The apparatus of claim 1, wherein the server computers in each subgroup report status information to their respective lead server computer, which reports subgroup status information to the catalog server computer.

11. The apparatus of claim 1, wherein the program code is further configured to automatically assign a new server computer to a subgroup.

12. A method, comprising:
    automatically configuring a plurality of networked server computers into a hierarchical architecture of subgroups configured to cooperate to perform a common processing task;
    designating a lead server computer of each subgroup for monitoring and managing operations of other server computers of the subgroup; and
    designating a catalog server computer of the plurality of networked server computers for managing each lead server computer, the catalog server computer including a heartbeating service to periodically ping each lead server computer to detect whether each lead server computer is available, wherein, when a particular lead server computer is detected as unavailable, the heartbeating service determines addresses of the server computers of the subgroup associated with the particular lead server computer and pings the server computers of the subgroup until a new lead server computer is selected for the subgroup.

13. The method of claim 12, wherein designating the lead server computer further comprises automatically selecting the lead server computer of each subgroup.

14. The method of claim 12, further comprising automatically assuming operations from the catalog server computer in an event of a failure.

15. The method of claim 12, further comprising automatically assuming operations from the lead server computer in an event of a failure.

16. The method of claim 12, further comprising automatically selecting the lead server computer using the other server computers of the subgroup.

17. The method of claim 12, further comprising communicating status information from the other server computers of the subgroup to the lead server computer.

18. The method of claim 12, further comprising communicating subgroup status information from the lead server computer to the catalog server computer.

19. The method of claim 12, further comprising automatically assigning a new server computer to a subgroup.

20. A non-transitory computer usable medium having computer usable program code embodied therewith, the computer usable program code executable by a processor to:
    automatically configure a plurality of networked server computers into a hierarchical architecture of subgroups configured to cooperate to a common processing task, wherein the architecture includes a lead server computer of each subgroup for monitoring and managing operations of the other server computers of the subgroup, and a catalog server computer of the plurality of networked server computers in communication with and configured to manage each lead server computer, the catalog server computer including a heartbeating service to periodically ping each lead server computer to detect whether each lead server computer is available, wherein, when a particular lead server computer is detected as unavailable, the heartbeating service determines addresses of the server computers of the subgroup associated with the particular lead server computer and pings the server computers of the subgroup until a new lead server computer is selected for the subgroup.

* * * * *